Fig.1.

Patented Feb. 28, 1928.

1,660,503

UNITED STATES PATENT OFFICE.

BENJAMIN GREENFIELD, OF BARTLESVILLE, OKLAHOMA, ASSIGNOR, BY MESNE ASSIGNMENTS, TO DOHERTY RESEARCH COMPANY, OF NEW YORK, N. Y., A CORPORATION OF NEW YORK.

FLUID METER.

Application filed March 27, 1919. Serial No. 285,596.

This invention relates to fluid meters and more particularly to meters for making measurements separately of the percentage composition of a liquid mixture, the specific gravity of a liquid, or the volume and rate of flow of a fluid flowing through a conduit, and to meters for making simultaneously a combination of two or more of these measurements.

Orifice meters have become widely used for measuring the volume of fluid flowing through a conduit. These meters, however, are limited to the measurement of certain kinds of fluids and the measurement of many of these fluids can only be made under certain conditions of temperature. No orifice meter, and in fact none of the various types of meters on the market, will give the satisfactory measurements of the volume of flow in a pipe of heavy viscous liquids such as mineral and vegetable oils, glues, liquid starch and the like. Also, any mobile liquids which will freeze and any gases carrying a liquid which will freeze cannot be measured in an orifice meter unless the meter is close to the pipe line in which the fluids are flowing and maintained at a temperature above the freezing point of such liquids.

One object of the present invention is to provide a meter for measuring the volume and rate of flow of fluid flowing through a conduit, which is adapted for measuring any fluid under all of the various atmospheric conditions.

Water containing alkali salts is found in most of the petroleum oil wells and this water comes out of the wells with the oil. If the oil is agitated in the presence of this hard water, an emulsion is formed which is very detrimental to the oil. The emulsion is formed by the pumping apparatus and if the pumps do not work properly, the percentage of emulsion in the oil is greatly increased. It is the common practice of oil well operators to periodically inspect the oil to see the quantity of emulsion therein and thus determine whether the pumps are working satisfactorily. If the proportion of emulsion is high, the pumps are usually drawn from the wells and repacked to maintain a minimum agitation of the oil in the well. When the oil coming from the well is flowing into a tank which may contain oil having a small proportion of emulsion or oil containing a large proportion of emulsion, it is difficult to determine the proportion of emulsion in the oil just entering the tank. For this reason an oil having a high percentage of emulsion therein may run into the tanks for a long period before it is detected.

With this in view, another object of the invention is to provide a meter by which the percentage composition of a liquid mixture may be accurately determined. In the preferred form of the invention, the meter is used for making a continuous record of the percentage composition of the liquid mixture flowing through a conduit, but the meter is equally well adapted for determining the percentage composition of a liquid mixture which is standing in a container.

Heretofore no satisfactory meter has been manufactured which might be used for measuring the flow of crude petroleum through a pipe line. When crude petroleum is being pumped from an oil well or transported through a pipe line, it is usually run into a tank of known capacity and there measured. If water and oil-water emulsion are present in the oil which is delivered to a tank, they are allowed to settle to the bottom of the tank and the water is usually drawn off from the tank continuously. On account of this practice, the tank is a very inconvenient means of measuring the volume of oil flowing through a pipe line. Further, a tank is not a satisfactory device for determining the rate of production of the oil well at any particular time or for determining the percentage of water and oil-water emulsion in the oil.

Accordingly, another object of the invention is to provide a meter by which the rate of flow of a liquid mixture in a conduit may be continuously recorded and simultaneously therewith the percentage composition of the liquid mixture may be recorded.

A further object of the invention is to provide a meter for indicating the specific gravity of a liquid in which the indication will be corrected for changes in density of the liquid due to changes in temperature.

With these and other objects in view, the invention consists in the improved fluid meter hereinafter described and particularly defined in the claims.

The various features of the invention are illustrated in the accompanying drawings in which.

The meter embodying the preferred form of the invention is arranged to make a continuous record of the volume and rate of flow of a liquid mixture flowing through a conduit and a corresponding continuous record of the percentage composition of the liquid mixture. The device for making a record of the volume and rate of liquid flow is arranged to indicate the differential pressure at opposite sides of an orifice plate in the conduit and this indication serves as an accurate check for the volume of flow record being made. The devices for making a record of the percentage composition of a liquid mixture are arranged to give an indication of the specific gravity of the liquid and this indication serves as a means to give an accurate check on the record of the percentage composition of the liquid mixture flowing through a conduit. The term "fluid" as used in the specification and claims is used in its broader sense as meaning both liquids and gases.

The meter illustrated in the drawings is designed for measuring fluid mixtures such as crude oil and water, crude oil and oil-water emulsion, or crude oil, water and oil-water emulsion. The crude oil mixture to be measured is introduced into an upright measuring conduit 10 (Fig. 1) through an opening 12, and passes down through the conduit into a gun barrel water-settling tank diagrammatically illustrated at 14. The water in the oil entering the tank 14 is drawn off continuously through an opening at the bottom of the tank and the clean oil overflows through an opening 16 at the top of the tank. To make a measurement of the volume of liquid flowing through the conduit 10, the conduit is formed into the usual orifice meter and the measurement of flow depends upon the difference in pressure of the oil at opposite sides of an orifice plate. To this end an orifice plate 18 is positioned transversely of the lower end of the conduit and upright pressure-measuring pipes 20 and 22 are connected to the conduit at opposite sides of the plate 18. The pipe 20 is connected with the conduit 10 above the plate 18 at a distance approximately equal to the diameter of the conduit and the pipe 22 is connected with the conduit 10 below the plate 18 at a distance approximately equal to one-half the diameter of the conduit. The liquid entering the pipes 20 and 22 from the conduit will stand in the pipes at a height proportional to the pressure of the liquid in the conduit at the points of connection of the pipes with the conduit. The measurement of the liquid pressure in the pipes 20 and 22 is made by determining the hydrostatic head of the liquid in the pipes 20 and 22 above a predetermined level. To accomplish this, pressure tubes 24 and 26 project respectively downwardly into the pipes 20 and 22 and gas is forced through the pipes under a pressure proportional to the weight of the hydrostatic heads of the liquids in the pipes 20 and 22 above the lower ends of the tubes 24 and 26. The gas which is forced through the tubes 24 and 26 under pressure may consist of a natural gas which is available in most oil fields or it may consist of any gas which is not soluble in the liquid being measured. The apparatus shown in the drawings is arranged to use air as a measuring medium, the air being placed under pressure by a compressor 28 and held in a pressure tank 30. The air in the tank 30 is conducted by a pipe 32 to a sight-feed regulating device 34 which is divided into three compartments, with compartments 36 and 38 (Fig. 1), connected respectively by pipes 40 and 42 with the pressure tubes 24 and 26. The compartments of the regulating device are partially filled with liquid, and the air from the pipe 32 is admitted into the liquid in regulated amounts by means of needle valves 44. When the apparatus is in full operation, the velocity of flow of gas through the tubes 24 and 26 may be observed through a transparent face of the regulator 34 and will be equal to the velocity with which gas from the needle valves 44 bubbles through the liquid in the compartments 36 and 38. The amount of gas flowing through the tubes 24 and 26 should be substantially the same and it is only necessary that the gas be placed under a sufficient pressure to force gas entirely to the lower ends of the tubes 24 and 26. In order, however, to be sure that the gas is under sufficient pressure to make an accurate measurement, it is preferred to slowly bubble gas from the lower ends of the pressure tubes.

The pressures developed in the tubes 24 and 26 are measured respectively by fluid manometers 46 and 48 (Figs. 3 and 4), which are connected with the tubes by pipes 50 and 52. The manometers 46 and 48 are positioned near the rear side of a recording casing 54 and consist of indicating legs 56 which are connected with the pipes 50 and 52 and displacement legs 58 which are connected with the legs 56 by tubes 60. The manometer indicating legs 56 are transparent and the liquid therein is adapted to register over an indicating scale 62 which has suitable graduations for measuring the difference in pressure developed in the tubes 24 and 26.

The pressure differential as determined from the pressures in the tubes 24 and 26 may be converted into terms of volume and rate of flow through the conduit 10 by the well known formula of the orifice meter. To make a continuous record of the volume and rate of flow of liquid through the conduit 10, displacement rods 64 and 66 are suspended in the manometer displacement legs 58 (Fig. 4), and pivotally connected to the ends of a beam 68 which is centrally pivoted on a bracket 70 attached to the recorder casing 54. A recording pen 72 is secured to the beam 68 and arranged to move over the face of a recording chart which may be slowly rotated by clockworks located in a casing 74. The chart is preferably provided with graduations reading in barrels per unit of time and the pen 72 will trace a continuous rate of flow record on the chart. By integrating the chart record, the volume of flow over any desired time period is obtained. The record being made by the recording pen 72 may be checked at any time by use of the manometer readings on the indicating scale 62.

Figure 1:
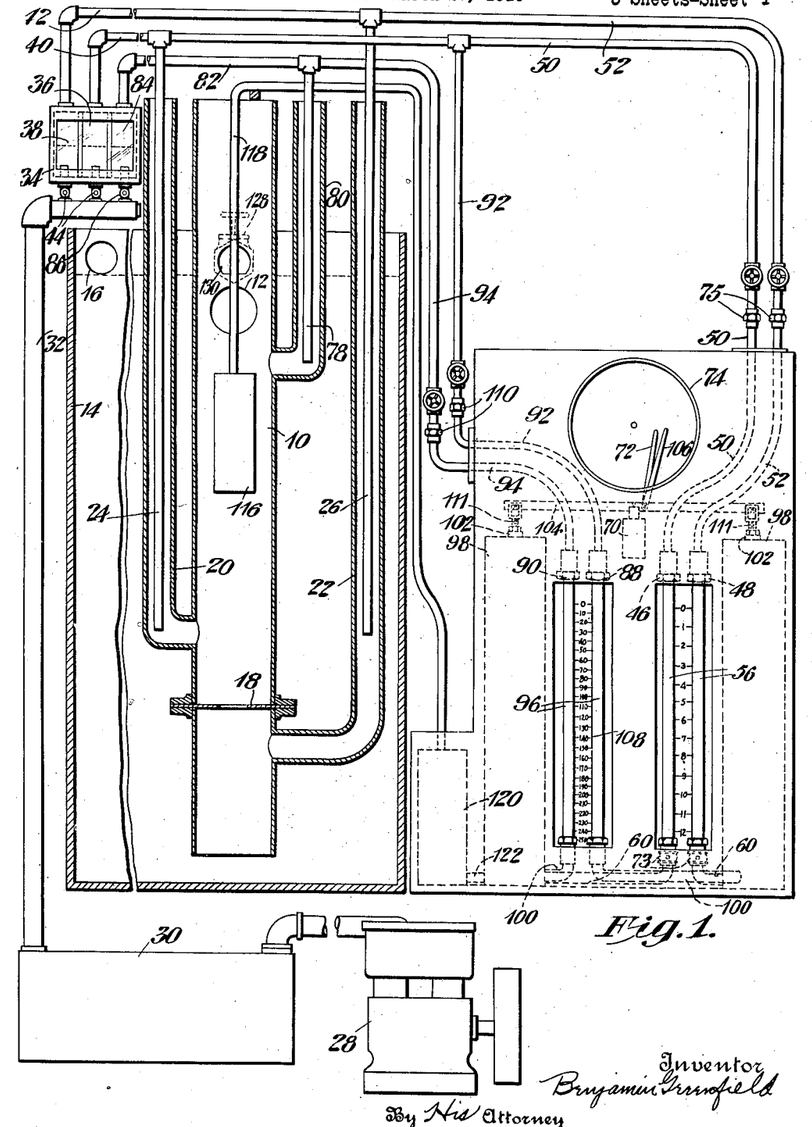
Figure 1 is a view in front elevation, partly in section, of a fluid meter embodying the preferred form of the invention.

To adjust the recording mechanism for making an accurate record of the volume and rate of liquid flowing through the conduit 10, the manometer legs 56 are opened to the atmosphere by disconnecting the pipes 50 and 52 at couplings 75 (Fig. 1). Manometer liqiud, which preferably consists of a mineral seal oil, is then run into the manometers 46 and 48 until it stands at zero on the indicating scale 62 in both of the indicating legs 56. The recording beam 68 then must be adjusted to bring the recording pen 72 to zero on the chart while the liquid in the indicating legs 56 stands at zero on the scale 62. The beam 68 is adjusted by adjusting the displacement rods 64 and 66 longitudinally in the manometer legs 58 to vary the amount of submergence of the rods in the manometer liquids. The adjustment of the rods 64 and 66 is effected by means of threaded shanks 76 which are secured to the rod pivots 77 and screwed into the upper ends of the rods. The displacement rods 64 and 66 have the same diameter, the same weight, and the same length and the lever arms at the opposite end of the pivot of the beam 68 are equal so that the differential movement of the manometer liquid in the displacement legs 58 acts to directly move the recording pen across the chart. When the recording pen 70 72 and the liquid in the indicating legs 56 are adjusted to zero on their respective scales, the pipes 50 and 52 are connected with the pressure tubes and the recording mechanism is then in adjustment for making accurate readings. The meter once properly adjusted is standard for all capacities and may be adapted to different rates of flow by substituting orifice plates 18 having different sizes of orifices. The orifice opening should be of such a size that the range of static pressures at the opposite sides of the orifice plate for predetermined rates of flow will give the proper pressure in the manometers 46 and 48 to move the liquid in the transparent legs 56 the full standard differential pressure deflection on the scale 62 and to move the recording pen 72 across the radius of the chart.

It will be noted that the manometer legs 58, the pressure pipes 20 and 22, and the measuring conduit 10, are all open to the atmosphere. With this construction, the measurements, indications and records are all made under the same pressure. Mercury or mercury and mineral seal oil may be used instead of mineral seal oil for filling the manometers if it is desired to use the meter on higher static pressures, and suitable check valves 73 may be provided for preventing the blowing out of oil or mercury from the manometers if excessive static pressures are apt to be encountered.

The pressure pipes 20 and 22 separate a portion of the liquid being measured from the main body of liquid flowing through the conduit. This construction is particularly designed to avoid inaccuracies which might result due to an accumulation of air or gas bubbles in the oil. With crude oil, for example, the oil, water and emulsion might stratify and an air bubble might be trapped in or between any of these strata. If this condition existed, the pressure developed in the tubes 24 and 26 would not be strictly proportional to the weight of the static head of the liquid in conduit 10 above the end of the measuring tubes unless the ends of the measuring tubes were on or below the division line of the strata. With the tubes 24 and 26 positioned close to the bottom of the pressure pipes 20 and 22, inaccurate measurements are avoided since the gas for measurement is forced out of the lower ends of the pipe and therefore the lower ends of the pipe are upon or below any division line where gas may be trapped in the liquid in the pipes. Also, with the gas slowly bubbling from the ends of the measuring tubes, it will serve to agitate liquid in the pipes 26 and thus aid in preventing stratification.

The determination of the percentage composition of the ingredients in a liquid mixture is made by developing a differential gas pressure in the liquid proportional to the specific gravity of the liquid and applying this differential pressure to a manometer operated mechanism to be recorded in terms of the percentage composition. The measurement of the differential gas pressure is obtained by positioning the open ends of pressure tubes different predetermined vertical distances below the surface of the liquid to be measured and determining the pressure required to displace a predetermined column of the liquid. If the liquid flowing through the conduit 10 always stood at a uniform level, the percentage composition of a liquid mixture might be found by the pressure tube 24 alone. Since the liquid level in the conduit 10 may be variable, it is desirable to use with the pressure tube 24, a pressure tube 78 which has its lower end positioned a predetermined distance above the lower end of the tube 24 and arranged to communicate with the conduit 10 through an upright pressure pipe 80. The tube 78 is connected by a pipe 82 with a compartment 84 in the sight-feed regulator 34 and is arranged to be supplied with air or gas from the pipe 32 by means of a needle valve 86. The differential gas pressure developed in the tubes 24 and 78 is measured by means of manometers 88 and 90 (Figs. 2 and 3) which are connected with the tubes by means of a pipe 92 conected with the pipe 50 and a pipe 94 connected with the tube 78. The manometers 88 and 90 are positioned in the front portion of the manometer casing 54 and consist of transparent indicating legs 96 which are connected with the pipes 92 and 94 and displacement legs 98 which are connected with the transparent legs 96 by tubes 100. To make a continuous record of the pressure difference applied to the manometer legs 96, displacement rods 102 are suspended in the manometer legs 98 and pivotally connected to opposite ends of a beam 104 which is centrally pivoted on the bracket 70. A recording pen 106 is secured to the beam 104 and arranged to move across the face of the chart rotatably mounted in the casing 74. The chart will have two sets of graduations thereon which are preferably printed in different colored inks, one set of graduations being used to indicate volume of flow of a liquid for reference to the pen 72, while the other set of graduations would refer to percentage composition of ingredients in a liquid mixture for reference to the pen 106.

The depth in conduit 10 is variable, as mentioned above. The reading of the air pressure developed in tube 24, taken with the specific gravity, determines the depth of liquid in conduit 10. The varying depth in conduit 10 and pipe 20 at a given time is obtained by a simple computation from the air pressure in tube 24 and the specific gravity in conduit 10. The depth in conduit 10 and pipe 20 above the level of outlet 16 increases with the flow through orifice plate 18, the back pressure at plate 18 increasing with the flow. The depth in conduit 10 computed as just mentioned affords a check on the flow readings obtained by other means herein disclosed.

Since the differential pressure developed by the tubes 24 and 78 is a pressure required to displace a predetermined head of liquid, this pressure may readily be converted with reference to a mixture of liquids of known specific gravity to the weight of a unit volume of liquid or the specific gravity of the liquid. The meter shown in the drawings is designed for measuring a mixture of crude oil and oil-water emulsion and a scale 108 is positioned behind the manometer legs 96 which is provided with graduations for indicating the specific gravity of the liquid mixture being measured. With oil and water of known specific gravities, the specific gravity readings from the scale 108 may be converted easily into terms of percentage composition of an ingredient in a liquid mixture and thus serve as a means for checking the readings of the recording pen 106.

The adjustment of the mechanism for making an accurate record of the percentage composition of the ingredients in a liquid mixture may be made as follows: For the purpose of illustration, in the present drawings, it is assumed that the specific gravity of the oil being measured is .85 and the specific gravity of the water being measured is 1.0. The graduations on the scale 108 are arranged to include practically the entire movement of oil in the legs 96 between the limits of specific gravity between 0 and 1.0 plus sufficient additional scale to take care of the pressure due to the depth of submergence of pipe 78. On the scale, the graduations indicate the specific gravities multiplied by 100. Then with the conduit 10 full of water, the reading on the manometers 96 would be 90 and 190 or a difference of 100, while with the conduit full of oil, the reading would be 75 and 160 or a difference of 85. To adjust the mechanism for measuring oil, the manometers 88 and 90 are opened to the atmosphere by disconnecting couplings 110 in the pipes 92 and 94 (Fig. 1) and mineral seal oil is placed in the manometers to bring the oil in the transparent leg 96 at the left (Fig. 2) to zero on the scale 108 and to bring oil in the transparent leg 96 at the right to 85 on the scale 108. With the manometer legs in this adjustment the beam 104 should be adjusted to position the recording pen 106 at zero on the chart. The adjustment of the recording pen preferably is made by adjusting the rods 102 longitudinally of the manometer legs 98 by means of threaded shanks 111 which are screwed into the upper ends of the rods and attached to the beam pivots 112. The adjustment of the recording pen 106 to zero may, also, be assisted by means of a rider 113 (Fig. 2) mounted on beam 104. With the manometer legs 96 adjusted to zero and 85 on the scale 108 and the recording pen at zero on the chart, the beam is then blocked with the pen at 100 on the chart and the oil brought to 100 in the right leg 96, and to 0 in the left leg. If the meter is then properly calibrated, the pen should stand at 100 in the chart when beam 104 is released. With the beam again blocked at zero on the chart, the oil level is again brought to zero on the scale 108 in both legs 96 and the manometers 88 and 90 are connected to the pipes 92 and 94 through the couplings 110, and the recording mechanism is in proper adjustment for recording directly the percentages of water in an oil-water mixture. With the recording mechanism calibrated as shown in the drawings, the chart should record 100% for pure water and the difference between the readings on the manometer legs 96 should be 100 to indicate a specific gravity of 1.0. If the liquid mixture flowing through the conduit should consist of 50% water and 50% oil, the pen should record 50% on the chart and the difference between the readings of the manometer legs 96 should be 92.5 to indicate a specific gravity of the liquid of .925.

Figure 2:
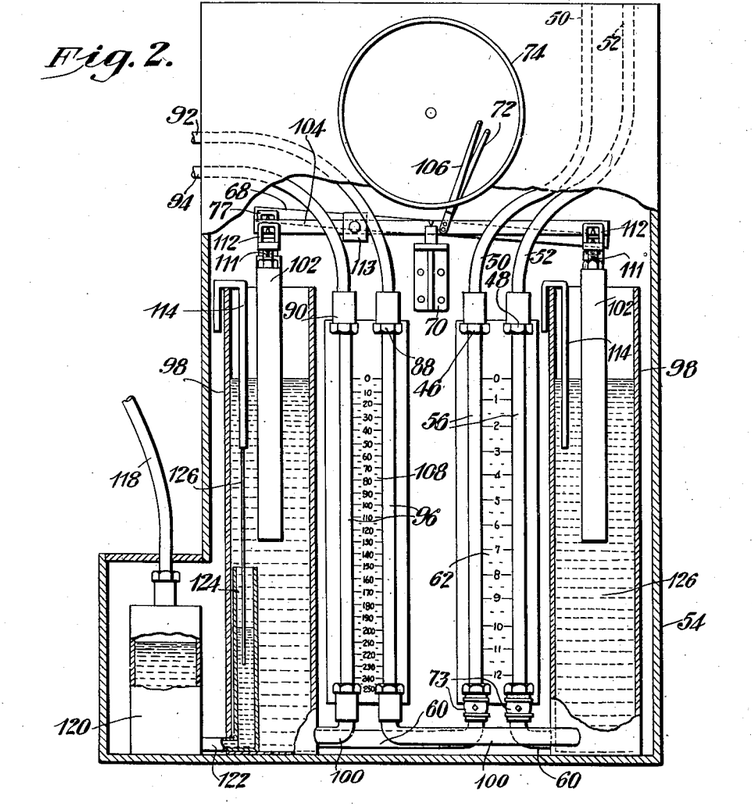
Fig. 2 is a view in front elevation partly in section of the recording mechanism of the fluid meter.
Figure 3:
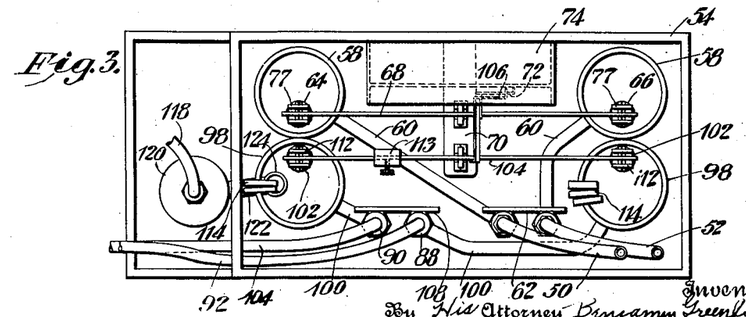
Fig. 3 is a top plan view of the recording mechanism shown in Fig. 2 with the cover of the recorder casing removed.
Figure 4:
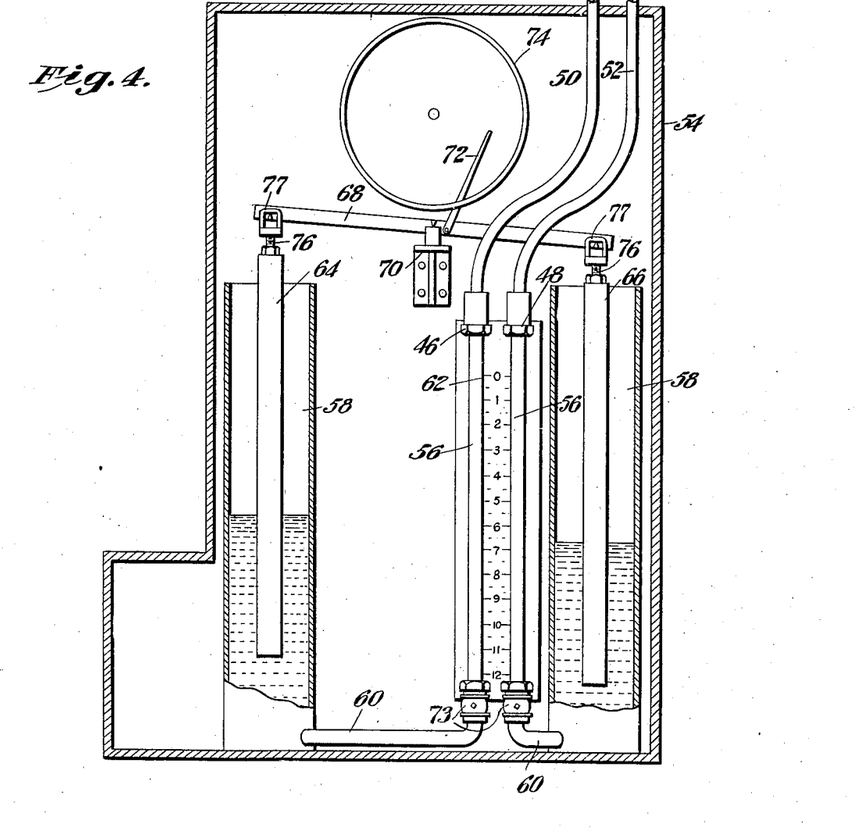
Fig. 4 is a view in vertical section of the recording mechanism, particularly illustrating the device for recording the volume of liquid flowing through a conduit.

When measuring liquid mixtures having different specific gravities, it may not always be practical to have displacement rods 102 which have a proper cross-sectional area with reference to the cross-sectional area of the manometer legs 98 to permit the recording pen 106 to be positioned at 0 and 100 respectively on the chart, when the liquids in the transparent manometer legs 96 are positioned on the scale 108 opposite the respective specific gravities of the ingredients in the particular liquid mixture being measured. To provide for this adjustment, the effective area of the manometer legs 98 with reference to the cross-sectional area of the displacement rods 102, may be changed by means of displacement members 114 (Figs. 2 and 3). The displacement members 114 consist of wires arranged to extend into the liquid of the manometer's legs 98 and having hooks on their upper ends to hold them in position in the manometer legs. These displacement members may be used in both legs 98 of the manometers in different numbers and sizes to give the proper 100% adjustment of the recording mechanism after the zero adjustment has first been made.

The density of oils changes considerably with large variations in temperature and therefore if the temperature of the oil being measured varies through an appreciable range, the meter records and indications should be corrected for temperature variations. To make this temperature correction, a closed bulb 116, arranged to hold an expansible gas or liquid such as nitrogen or ether, is placed in the liquid conduit 10 in position to be immersed in the liquid being measured and the expansion or contraction of the gas in the bulb due to changes in temperature is utilized for varying the position of the measuring liquid in the manometer 90 (Fig. 2). The bulb 116 is suspended from the end of a pipe 118 which is connected with a mercury reservoir 120 (Figs. 1 and 2) positioned in the recorder casing 54. The mercury reservoir 120 is connected by means of a tube 122 with an upright open pipe 124 positioned in the bottom of the left manometer leg 98. The upright pipe 124 forms a manometer with the mercury reservoir 120 so that the mercury will rise in the pipe a predetermined distance in accordance with the relative cross-sectional areas of the mercury reservoir and the pipe. Although it is preferred to use mercury in the reservoir 120 and pipe 124, this is not essential and any liquid may be used therein which is immiscible with and more dense than the liquid used in the manometers 88 and 90. The manometer liquid stands in the pipe 124 above the mercury or temperature correcting liquid, and as the mercury rises and falls due to expansion and contraction of the gases in the bulb 116, the position of the liquid in the manometer leg 98 will be varied, thus changing the position of the displacement rods 102 to automatically correct the reading of the recording pen 106 and the reading of the liquid in the transparent manometer legs 96.

In the mechanism for making the temperature changes for density, the design of the cross-sectional areas of the pipe 124 with relation to the cross-sectional areas of the manometer legs 98 and 96, is arranged to give the proper temperature corrections for the percentage composition record and the density indications. When it is necessary, however, to change the effective cross-sectional areas of the manometer legs 98 with displacement members 114 in making the recording mechanism adjustment for different types of liquid mixtures, the cross-sectional area of the pipe 124 should be correspondingly changed to give the proper temperature correction. To provide for this, rods 126 (Fig. 2), are attached to the lower ends of the displacement members 114 and are arranged to project into the mercury of the pipe 124. The rods 126 have a predetermined length and cross-sectional area with relation to the cross-sectional area of the members 114 and are arranged to vary the effective cross-sectional area of the pipe 124 proportionally to the variation of the cross-sectional area of the manometer leg 98 by the members 114.

As described above, two measuring tubes 24 and 78 (Fig. 1) are used in determining the percentage composition of the ingredients of a liquid mixture. Fairly accurate measurements, however, may be made by using only the measuring tube 24. To accomplish this, the tube 78 is disconnected by closing the valve 86 in the sight-feed and the valve in the pipe 94 and by disconnecting the coupling 110 in the pipe 94 to open the manometer 90 to the atmosphere. The oil flowing through the measuring conduit is maintained at a uniform level by opening a valve 128 in a pipe 130 at the upper end of the conduit and permitting oil to overflow from the conduit. The head of liquid then being measured is equal to the difference in height of liquid between the bottom of the tube 24 and the weir edge of the overflow pipe 130.

Although the mechanism for measuring and recording the volume and rate of flow of fluid in a conduit has been illustrated and described as being used for measuring fluid flowing through an orifice plate, such as 18 (Fig. 1), it is not limited to such use. This mechanism is well adapted for use with any of the well known types of orifice plates. The mechanism is also well adapted for use with Venturi and Pitot tubes or any of the devices for measuring the flow of liquid by producing an obstruction to the flow of the liquid, to develop in the liquid different pressures of a definite relation.

With the meter construction described above, it will be seen that the recording mechanism of the meter may be located any desired distance from the measuring conduit 10 and still permit accurate measurements of the liquid. The air or gas which is used as a measuring medium is very sensitive to pressure changes and is not affected by changes in atmosphere conditions. The gas comes directly into contact with the liquid being measured and does not permit any corrosive, viscous, or other types of liquid to come in contact with the recording or indicating mechanism to interfere with the readings or to cause the mechanism to get out of order. The construction of the meter also permits the recording mechanisms of a large number of meters to be assembled in a central reading station, although the measuring conduits may be distributed over a very large area.

The preferred form of the invention having been thus described, what is claimed as new is:

1. A liquid meter having, in combination, a plurality of pneumatic flow measuring devices arranged to communicate with a body of liquid mixture to be measured at different predetermined levels, mechanism connected with one of said devices responsive to changes in density of said liquid, and mechanically operable means cooperating with said mechanism to indicate the percentage composition of said liquid mixture.

2. A liquid meter having, in combination, a plurality of flow measuring devices arranged to communicate with a body of liquid mixture at different levels, means connected with one of said devices for developing a fluid pressure proportional to the gravity of said liquid, and mechanism connected with said means and operated by the pressure therein for indicating directly the percentage composition of said liquid mixture.

3. A liquid meter having, in combination, an upright conduit, a flow restricting orifice in said conduit, open tubes arranged to project different predetermined vertical distances into a liquid mixture flowing through said conduit, regulated means for slowly forcing gas through said tubes at a pressure equal to the head of liquid above the submerged ends of said tubes, indicating manometers connected with said tubes, and means operated by said manometers for indicating the percentage composition of said liquid mixture.

4. A liquid meter having, in combination, two upright pipes arranged to communicate with a body of liquid flowing in a non-horizontal plane at different predetermined distances below its surface, a gas tube opening into each of said pipes at approximately the bottom thereof, means connected with said tubes for producing a differential gas pressure proportional to the specific gravity of the liquid, and mechanically operable means for indicating said differential pressure.

5. A liquid meter having, in combination, a plurality of devices arranged to communicate with a body of a liquid mixture at different vertical depths, means to force gas under pressure through said devices into said liquid, mechanism operated by said pressure means for indicating the specific gravity of said liquid, and means cooperating with said mechanism and arranged to contact with said liquid for correcting said indication for temperature changes in said liquid.

6. A liquid meter having, in combination, two open-ended tubes arranged to project different distances below the surface of a liquid mixture to be measured, means to force gas through said tubes under pressure, U-tube manometers connected with said tubes, displacement rods suspended in one leg of each of said manometers, a pivoted beam connected with said rods, and a recording device mounted on said beam.

7. A liquid meter having, in combination, two tubes arranged to be positioned in the liquid to be measured, means to develop a differential gas pressure in said tubes proportional to a specific physical property of said liquid, and recording means connected with said tubes comprising U-tube manometers responsive to said pressure, displacement rods suspended in one leg of each of said manometers, a pivoted beam connecting said rods, and a recording device mounted on said beam.

8. A liquid meter having in combination two tubes arranged to be positioned in the liquid to be measured, means to develop a differential gas pressure in said tubes proportional to a specific physical property of said liquid, and recording means connected with said tubes comprising U-tube manometers responsive to said pressure, displacement rods suspended in one leg of each of said manometers, a pivoted beam connected with said rods, a recording device mounted on said beam, and means by which said rods may be longitudinally adjusted in said manometer legs.

9. A liquid meter having in combination two tubes arranged to be positioned in the liquid to be measured, means to develop a differential gas pressure in said tubes proportional to a specific physical property of said liquid, and recording means connected with said tubes comprising U-tube manometers responsive to said pressure, displacement rods suspended in one leg of each of said manometers, a pivoted beam connecting said rods, a recording device mounted on said beam, and means for varying the effective area of said manometer legs.

10. A liquid meter having, in combination, two tubes arranged to be positioned in the liquid to be measured, means to develop a differential gas pressure in said tubes proportional to a specific physical property of said liquid, and recording means connected with said tubes comprising U-tube manometers responsive to said pressure, displacement rods suspended in one leg of each of said manometers, a pivoted beam connecting said rods, means by which said rods may be longitudinally adjusted in said manometer legs, means for varying the effective area of said manometer legs, and a recording device mounted on said beam.

11. A liquid meter having, in combination, two tubes arranged to be positioned in the liquid to be measured, means to develop a differential gas pressure in said tubes proportional to a specific physical property of said liquid, and recording means connected with said tubes comprising U-tube manometers responsive to said pressure, displacement rods suspended in one leg of each of said manometers, a pivoted beam connecting said rods, a rider adjustable longitudinally of said beam, and a recording device mounted on said beam.

12. A liquid meter having, in combination, two tubes arranged to be positioned in the liquid to be measured, means to develop a differential gas pressure in said tubes proportional to a specific physical property of said liquid, and recording means connected with said tubes comprising U-tube manometers responsive to said pressure, displacement rods suspended in one leg of each of said manometers, a pivoted beam connecting said rods, a rider adjustable longitudinally of said beam, means by which said rods may be adjusted longitudinally of said manometer legs, and a recording device mounted on said beam.

13. A liquid meter having in combination, a plurality of flow-measuring devices communicating with a flowing body of liquid mixture to be measured at different predetermined levels and subject to the static pressure of said liquid, means to introduce gas into said devices under pressures equal to the static pressure of said liquid, pressure-responsive mechanism connected with said devices, and mechanically operable means co-operating with said mechanism to indicate the percentage composition of said liquid mixture.

14. A liquid meter having, in combination, two open-ended tubes of different predetermined lengths arranged to be positioned in a liquid being measured, a source of gas supply under pressure to force gas through said tubes, means to regulate the flow of gas through said tubes, U-tube manometers communicating with said tubes, an indicating liquid in said manometers, displacement rods suspended in one leg of each of said manometers, a pivoted beam connecting said rods, a recorder on said beam, a container for an expansible liquid arranged to be positioned in said liquid, an open pipe positioned within the liquid in said manometer legs, said pipe containing a liquid immiscible with said manometer liquid, and a conduit communicating with said container and pipe.

15. A liquid meter having, in combination, two open-ended tubes of different predetermined lengths arranged to be positioned in a liquid to be measured, a source of gas supply under pressure to force gas through said tubes, U-tube manometers communicating with said tubes, an indicating liquid in said manometers, displacement rods suspended in one leg of each of said manometers, a pivoted beam connecting said rods, a recorder on said beam, a container for an expansible liquid arranged to be positioned in said liquid, an open pipe positioned within the liquid in said manometer legs, said pipe containing a liquid immiscible with said manometer liquid, a conduit communicating with said container and pipe, and means for varying the effective areas of said manometer legs and said pipes.

16. A liquid meter having, in combination, two open-ended tubes of different predetermined lengths arranged to be positioned in a liquid to be measured, a source of gas supply under pressure to force gas through said tubes, means to regulate the flow of gas through said tubes, U-tube manometers communicating with said tubes, an indicating liquid in said manometers, displacement rods suspended in one leg of each of said manometers, a pivoted beam connecting said rods, and a recorder on said beam.

17. A liquid meter having, in combination, two open-ended tubes of different predetermined lengths arranged to be positioned in a liquid to be measured, a source of gas supply under pressure to force gas through said tubes, U-tube manometers communicating wth said tubes, an indicating liquid in said manometers, displacement rods suspended in one leg of each of said manometers, a pivoted beam connecting said rods, a recorder on said beam, means to vary the effective area of said manometer legs, and means to adjust said rods to provide for measurement of different kinds of liquids.

18. A liquid meter having, in combination, two open-ended tubes of different predetermined lengths arranged to be positioned in a liquid to be measured, a source of gas supply under pressure to force gas through said tubes, U-tube manometers so connected with said tubes as to be subjected to the pressures developed in said tubes, and means operated by said manometers to record said pressures, one leg of each of said manometers being arranged to be subjected to the same pressure as the pressure on the liquid to be measured.

19. A liquid meter having, in combination, two open-ended tubes having their open ends positioned at different depths in a liquid to be measured, a source of gas supply under pressure connected to said tubes to force gas through said tubes, U-tube manometers communicating with said tubes, one leg of each of said manometers being open to atmosphere and means operated by the manometers to record the difference of the pressures in the tubes.

20. A liquid meter having in combination, an upright liquid conduit, a flow retarding device mounted in the said conduit arranged to develop different pressures in a liquid flowing through said conduit proportional to the flow, pipes connected with said conduit at opposite sides of said device, means communicating with said pipes arranged to develop gas pressures proportional to the liquid pressures developed by said flow-retarding device, and means for indicating said pressures.

21. A liquid meter having, in combination, an upright conduit, a flow restricting orifice intermediate the ends of said conduit, mechanism communicating with said conduit arranged to develop a pressure differential proportional to the drop in static head of liquid in flowing through said orifice, and a device responsive to the pressure differential thus developed for indicating the rate of flow of liquid through said conduit.

22. In a liquid flow meter, the combination of an upright conduit, a flow restricting orifice mounted transversely of said conduit, two upright pipes open at the top to the atmosphere communicating with said conduit, one on each side of said orifice, said pipes serving as open top wells into which liquid within the conduit may rise under the hydrostatic head therein, and means for measuring the difference of hydrostatic head in said wells above a predetermined level.

23. A liquid meter having, in combination, a liquid conduit open to atmosphere, an orifice plate positioned transversely of said conduit, pipes connected with said conduit at opposite sides of said plate, said pipes being open to atmosphere, tubes having open ends projecting into said pipes, means to cause gas to slowly flow through said tubes, and means to indicate the pressure of gas in said tubes.

24. A liquid meter having, in combination, an upright conduit open at its upper end, an orifice plate positioned in said conduit, upright pipes connected with said conduit at opposite sides of said plate, tubes in said pipes with their ends opening at approximately the same level, means to cause gas to bubble from the open ends of said tubes, and means to indicate the gas pressure in said tubes.

25. A liquid meter having, in combination, an upright liquid conduit, an orifice plate positioned transversely of said conduit, upright pipes connected with said conduit at opposite sides of said plate, said pipes being open to atmosphere at their upper ends, tubes projecting into said pipes arranged to have their ends open at approximately the same level, means to cause gas to slowly bubble through said tubes, and indicating U-tube manometers connected with said tubes and having one leg thereof open to atmosphere.

26. A liquid meter having, in combination, an upright liquid conduit, an orifice plate positioned transversely of said conduit, upright pipes connected with said conduit at opposite sides of said plate, tubes positioned in said pipes and having their lower ends at approximately the same level, indicating U- tube manometers connected with said tubes, and means arranged to place one leg of said manometers under the same pressure as the liquid in said pipes.

27. A liquid meter having, in combination, an upright liquid conduit, an orifice plate in said conduit, upright pipes connected with said conduit at opposite sides of said plate, tubes projecting into said pipe with their ends at approximately the same level, a source of gas supply under pressure connected with said tubes, means for regulating the flow of gas through said tubes, manometers connected with said tubes, and means controlled by said manometers for recording the liquid flow in said conduit.

28. A liquid meter having, in combination, an upright liquid conduit, an orifice plate in said conduit, upright pipes connected with said conduit at opposite sides of said plate, tubes projecting into said pipe with their ends at approximately the same level, a source of gas supply under pressure connected with said tubes, U-tube manometers connected with said tubes, displacement rods suspended in one leg of each of said manometers, a pivoted beam connecting said rods, and a recording device connected to said beam.

29. A liquid meter having, in combination, an upright liquid conduit, an orifice plate in said conduit, upright pipes connected with said conduit at opposite sides of said plate, tubes projecting into said pipe with their lower ends at approximately the same level, a source of gas supply under pressure connected with said tubes, U-tube manometers connected with said tubes, displacement rods suspended in one leg of each of said manometers, a pivoted beam connected with said rods, a recording device connected with said beam, and means for adjusting said rods longitudinally of said manometer legs.

30. A liquid meter having, in combination, an upright liquid conduit, an orifice plate in said conduit, upright pipes connected with said conduit at opposite sides of said plate, tubes projecting into said pipe with their lower ends at approximately the same level, a source of gas supply under pressure connected with said tubes, U-tube manometers connected with said tubes, an indicating scale mounted adjacent one leg of each of said manometers, and means controlled by said manometers for recording the rate of liquid flow in said conduit.

31. A liquid meter having, in combination, an upright conduit, a flow restricting orifice mounted in said conduit intermediate its ends, means communicating with said conduit arranged to develop a pressure differential having an accurate relation to the rate of flow of liquid past said flow retarding device, mechanism communicating with said conduit arranged to develop a fluid pressure proportional to the specific gravity of liquid flowing through said conduit, and devices for indicating the pressure developed by said means and mechanism.

32. A liquid meter having, in combination, an upright conduit, an orifice plate mounted transversely of said conduit, two pipes connected respectively with said conduit at opposite sides of said plate, means communicating with said pipes arranged to develop a fluid pressure differential proportional to the drop in hydrostatic head of liquid in flowing through said orifice, means for recording the pressure differential thus developed in terms of rate of flow of liquid through said conduit, and means connected with one of said pipes arranged to indicate the specific gravity of liquid in said conduit.

33. A liquid meter having in combination, an upright conduit, an orifice plate in said conduit, a plurality of open upright pipes connected with said conduit at vertically spaced distances below the level of liquid therein, tubes opening into said pipes, two of said pipes being connected to the conduit at opposite sides of said plate and the open ends of the tubes therein positioned at approximately the same level, a source of gas supply under pressure connected with said tubes, pressure-operated devices connected with one of said tubes arranged to indicate the percentage composition of said liquid, and pressure-operated devices connected with the tubes in pipes connected to the conduit on opposite sides of said plate arranged to record the rate of flow of liquid through said conduit.

34. A liquid meter having, in combination, a conduit for a flowing liquid mixture, an orifice plate in said conduit, means connected with said conduit for producing a differential pressure proportional to a predetermined hydrostatic head of liquid therein, mechanism for building up a differential pressure proportional to the difference in pressure of the liquid at opposite sides of said plate, devices responsive to the pressure of said means for indicating the percentage composition of said liquid, and devices responsive to the pressure of said mechanism for indicating the rate of flow of liquid through said conduit.

35. A liquid meter having, in combination, an upright conduit, a plurality of upright pipes connected with said conduit as spaced vertical intervals below the level of liquid therein, a flow restricting orifice in said conduit intermediate the points of connection of two of said pipes therewith, tubes opening into each of said pipes adjacent to their lower ends, the open ends of the two tubes in the pipes connected with the conduit at opposite sides of said plate lying in approximately the same horizontal plane, a source of supply of gas under pressure connected with said tubes, manometers connected with tubes opening into the pipes connected with the conduit on the same side of said plate for indicating the specific gravity of said liquid, manometers connected with the tubes opening into pipes connected with the conduit at opposite sides of said plate for indicating the difference in pressure of the liquid on opposite sides of said plate, and recording devices controlled by said respective manometers for indicating the percentage composition of said liquid and the rate of flow of liquid through said conduit.

36. The combination of a tube arranged to project a predetermined distance below the level of a body of liquid mixture to be measured, means to maintain the liquid body at a definite level, a source of gas under pressure to slowly bubble gas from the submerged end of said tube, mechanism connected with said tube for measuring the pressure developed therein, and means cooperating with said mechanism to indicate the percentage composition of said mixture.

37. The combination of a tube arranged to project a predetermined distance below the level of a body of liquid mixture to be measured, means to maintain the liquid body at a definite level, a source of gas under pressure to slowly bubble gas from the submerged end of said tube, mechanism connected with said tube for measuring the pressure developed therein, indicating means connected with said mechanism to indicate the specific gravity of said liquid mixture, and means cooperating with said mechanism to indicate the percentage composition of said mixture.

38. A liquid meter having, in combination, a plurality of open ended tubes arranged to project predetermined different distances below the level of a body of liquid mixture to be measured, a source of gas under pressure to slowly bubble gas from the submerged ends of said tubes, means for independently cutting off the flow of gas through each of said tubes, U-tube manometers having legs connected with said tubes by means of pipes, means by which said pipes may be disconnected to open said manometers to atmosphere, and means controlled by said manometers to measure the percentage composition of said liquid mixture.

39. A liquid meter having, in combination, an upright conduit open at its top to the atmosphere, a flow restricting orifice mounted transversely of said conduit, mechanism communicating with said conduit at opposite sides of said orifice arranged to develop a fluid pressure differential proportional to the hydrostatic pressure differential developed by said orifice in liquid flowing therethrough, and means for indicating the pressure differential developed by said mechanism.

40. A method of measuring the density of a body of liquid flowing in a non-horizontal plane which comprises maintaining stationary bodies of the liquid in free communication with said flowing body at different levels and at the static pressures at said levels, introducing slow, regulated currents of fluid into said stationary liquid at said levels and at the static pressure at said levels, and measuring the difference in pressures of said fluid streams.

41. The method of determining the percentage composition of a liquid mixture which comprises continuously forcing slow streams of fluid into the liquid mixture at different levels, determining the difference in pressure of the streams of fluid and recording said difference in pressures in terms of the percentage composition of the liquid at the temperature existing in the body of liquid.

42. A method of measuring the rate of flow of a body of liquid, which comprises leading said liquid through a standardized horizontally placed flow retarding mechanism, forcing a measuring fluid at a uniform level into stationary liquid bodies communicating at opposite sides of said mechanism with said flowing body thereby placing said measuring fluid under pressures having a definite relation to the rate of flow of said body through said measuring mechanism, and measuring the pressure differential of said measuring fluid.

43. A method of measuring the rate of flow of a body of liquid, which comprises leading said liquid through a standard orifice mounted in a substantially horizontal plane, forcing a measuring fluid into liquid in contact with said flowing body at opposite sides of said orifice under pressures substantially equal to the pressures of said body at opposite sides of said orifice, and measuring the pressure differential developed in said measuring fluid.

44. A depth and specific gravity indicating apparatus, comprising conduits adapted to be submerged in liquid and severally having outlets at a known vertical distance apart, means for creating pneumatic pressures in each conduit sufficient to balance the head of liquid above the outlet thereof, and means for measuring the difference between the pressures so created in the several conduits in comparison with the corresponding pressure difference in a liquid of known specific gravity.

45. A depth and specific gravity indicating apparatus, comprising conduits adapted to be submerged in liquid and severally having outlets at a known vertical distance apart, means for creating pneumatic pressures in each conduit sufficient to balance the head of liquid above the outlet thereof, column indicating means in suitable arrangement and connection with said conduits to register the difference between the said pneumatic pressures therein, and a measure arranged to be read in connection with the positions of said column indicating means responsive to the respective pressures, said measure being graduated in terms of specific gravity.

In testimony whereof I affix my signature.

BENJAMIN GREENFIELD.